2 Sheets—Sheet 2.

W. H. FOYE.
Steam-Farming Apparatus.

No. 220,365. Patented Oct. 7, 1879.

Attest:
C. Clarence Poole
Frank L. Middleton

Inventor:
William H. Foye
By Ellis Spear
Attorneys

UNITED STATES PATENT OFFICE.

WILLIAM H. FOYE, OF SAN FRANCISCO, CALIFORNIA.

IMPROVEMENT IN STEAM FARMING APPARATUS.

Specification forming part of Letters Patent No. 220,365, dated October 7, 1879; application filed May 13, 1879.

*To all whom it may concern:*

Be it known that I, WILLIAM H. FOYE, of the city and county of San Francisco, and State of California, have invented a Steam Farming Apparatus; and I hereby declare the following to be a full, clear, and exact description thereof, reference being had to the accompanying drawings.

My invention relates to certain improvements in engines and apparatus for farm-work, the apparatus being made interchangeable, so that portions of it may be employed with the engine during the plowing season, while other portions may be employed with the same engine during the harvesting season, by simply removing the plowing apparatus and substituting therefor that necessary for harvesting, so that the whole will form a comparatively cheap and economical "plant" for all the principal work of a farm.

Figure 1:
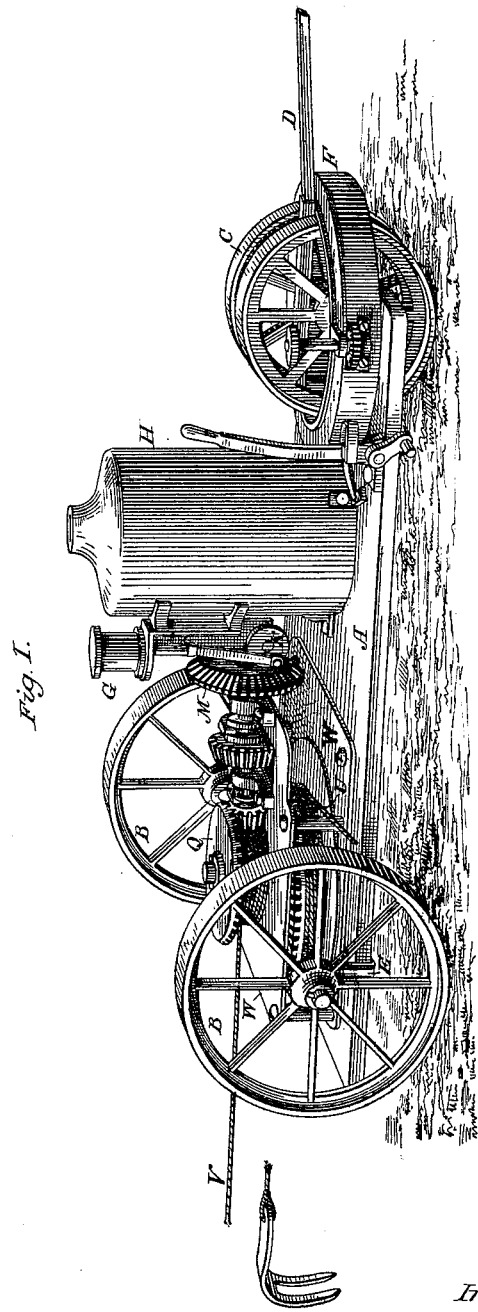
Figure 2:
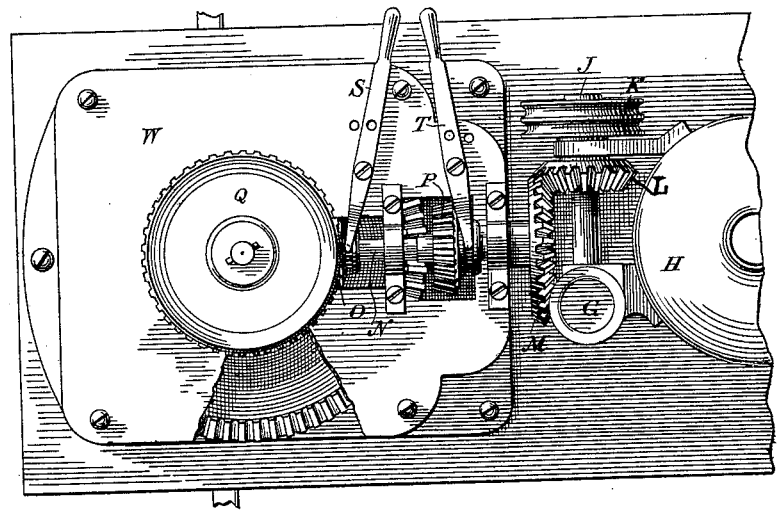
Figure 3:
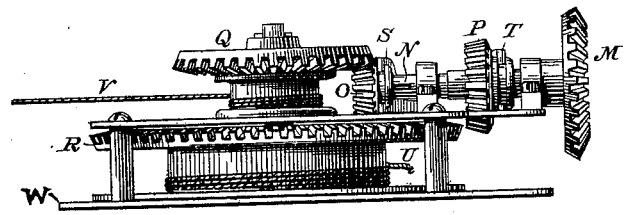

Referring to the accompanying drawings, Figure 1 is a perspective view. Fig. 2 is a top view of the driving-gear. Fig. 3 is a side view of the same.

In the present case I have shown my engine and boiler suitably mounted upon a bed, A, which is provided with bearing-wheels B, steering apparatus C, and a pole or means, D, by which a team may be attached to haul it from place to place, it being my design to dispense with the heavy machinery necessary for tractional purposes. The bed is supported upon a bent or crank axle, E, between the hind wheels and below the rim or case F of the front steering-wheels, so that the apparatus which is mounted upon it may be set as near the ground as possible.

This apparatus consists of the engine G, boiler H, and the mechanism which is designed to be employed in connection with a gang of plows, which are hauled across the field from one side to the other, alternately, by engines and apparatus suitably placed for the purpose.

The engine-crank is fixed to a shaft, J, which has fixed to it the pinion L and the pulley K, from which the belts lead to drive the reaping and thrashing mechanism when these are in place.

The pinion L meshes with the gear-wheel M upon the shaft N. This shaft N carries two pinions, O and P, which mesh, respectively, with the horizontal gear-wheels Q and R, one of which is placed above the other. These wheels are supported and turn upon a vertical shaft, and are each rigidly connected with a drum, so that either drum may be moved independently of the other. The pinions O and P are fitted to move upon feathers on the shaft, and are controlled by the levers S and T, by which either pinion is thrown into gear at pleasure.

The rope U, which is wound upon the lowest drum, connects with the gang of plows which are to be hauled across the field, and the rope V, which winds upon the upper drum, is connected with an anchor placed in the line of travel of the engine, so that by its use the engine may be moved forward to bring it into the proper position for each cut to be made by the plows.

The operation will then be as follows: In plowing, an engine is usually placed upon each side of the field, and the plows are hauled across the field by each engine alternately. The engines stand with their sides toward each other, which makes them stand firmly while drawing the plows, and they are in the proper position to be moved forward when desired. The engine standing in its position at one side of the field, and the plows being at the opposite side, the pinion O is thrown out of gear with the wheel Q, and the pinion P is connected with the wheel R. The rope U then begins to wind upon the drum of the wheel R, and thus draws the plows across the field until they reach the engine. The pinion P is then disconnected from the wheel R by the action of its lever T, and the plows stop. The pinion O is then thrown into gear with the wheel Q, and by winding the rope V upon its drum the engine is drawn forward the width of two cuts.

The plows I intend to use are of a peculiar construction, and are the subject of another application for a patent. They are mounted upon caster-wheels, and after the engine is set a few turns of the wheel Q will draw them diagonally over to the point where they commence to make their return cut. When this is begun the rope U is slackened, and being attached to the plows it is drawn across the field, so as to be ready for a new cut, which, when finished, brings the plows directly back to the engine. This is then moved forward again, as before described.

The distance to be moved each time will be double the width of the cut to be made, and each engine will be at rest one-half of the time. In moving the engines by means of the rope V and drum they will be drawn backward, or in an opposite direction from the pole attachment.

The steering apparatus, which is the same as that shown in combination with my engine and harvester, the subject-matter of another application, serves to guide the engine in its movements. The gears and pinions and the winding-drums are all mounted in an independent frame, W, which is bolted to the bed A, and when the bolts are withdrawn the whole apparatus can be removed bodily. The same bolt-holes serve for the attachment of the thrashing machinery, which is fully described in my application for a patent upon the same.

The object of my invention is to provide an economical mechanism, the parts of which shall be interchangeable, so that the engine, which is the most expensive, may be employed in combination with a plowing or a harvesting apparatus, at pleasure, without essential change.

By dispensing with the heavy machinery necessary upon engines which are intended to drive themselves I am enabled to make my engine so light that it can be easily hauled about by a team, and I can also set it so low that all the machinery is set upon the bed A without placing it too high to work, or to be removed and replaced conveniently. The engine and apparatus are applicable to all branches of farm-work where power is needed without being expensive or cumbersome.

Having thus described my invention, what I claim as new, and desire to secure by Letters Patent, is—

1. The steam farming apparatus, substantially as described, consisting of the platform A, supported on the bent rear axle and upon the front guiding-wheels, which are carried in the rim above the platform, in combination with the boiler and engine, arranged on the front of the platform, and with detachable mechanism in rear of the boiler on said platform, as set forth.

2. The combination, with the platform A, supported and steered as described, and carrying boiler and engine, of the secondary detachable platform W, carrying the shaft, clutches, and drum or drums, the said parts being arranged to be driven by the engine, as set forth.

3. The horizontal gear-wheel and drum Q, with its driving-pinion O and the rope V, in combination with the gear-wheel and drum R, with its driving-pinion P and rope U, whereby the plows may be hauled across the field and the engine advanced, substantially as herein described.

4. The shaft N, with its pinions O P, moving upon feathers, and controlled by the levers S and T, in combination with the gear-wheels and drums Q R, mounted one above the other upon the same vertical shaft, whereby the drums with their respective ropes U and V may be actuated independently of each other, substantially as and for the purpose herein described.

5. The gear-wheels Q and R, with their rope-winding drums, working independently upon the same vertical shaft, the pinions O and P, levers S and T, driving-shaft N, and pinion M, said mechanism being mounted upon the independent frame W, so as to be secured to the bed and connected with the engine, or removed bodily without other adjustment, substantially as herein described.

In witness whereof I have hereunto set my hand.

WILLIAM H. FOYE.

Witnesses:
FRANK A. BROOKS,
S. H. NOURSE.